United States Patent
Yost

(10) Patent No.: US 9,148,432 B2
(45) Date of Patent: Sep. 29, 2015

(54) RANGE WEIGHTED INTERNET PROTOCOL ADDRESS BLACKLIST

(75) Inventor: David N. Yost, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 559 days.

(21) Appl. No.: 12/902,448

(22) Filed: Oct. 12, 2010

(65) Prior Publication Data

US 2012/0089744 A1    Apr. 12, 2012

(51) Int. Cl.
  *G06F 15/173*    (2006.01)
  *H04L 29/06*    (2006.01)

(52) U.S. Cl.
  CPC .................................. *H04L 63/101* (2013.01)

(58) Field of Classification Search
  CPC ............. H04L 63/101; H04L 61/1511; H04L 29/12066; H04L 61/2061; H04L 51/12
  USPC ......................................................... 709/245
  See application file for complete search history.

(56) References Cited

U.S. PATENT DOCUMENTS

| | | | |
|---|---|---|---|
| 7,249,175 B1 | 7/2007 | Donaldson | |
| 7,676,566 B2 | 3/2010 | Lund et al. | |
| 7,716,351 B1 * | 5/2010 | White et al. | 709/229 |
| 7,970,844 B2 * | 6/2011 | Osborne et al. | 709/206 |
| 8,161,155 B2 * | 4/2012 | Van Der Merwe et al. | 709/225 |
| 8,572,731 B1 * | 10/2013 | Oliver | 726/22 |
| 2004/0260922 A1 * | 12/2004 | Goodman et al. | 713/154 |
| 2005/0097223 A1 * | 5/2005 | Shen et al. | 709/245 |
| 2005/0188036 A1 * | 8/2005 | Yasuda | 709/206 |
| 2005/0193073 A1 * | 9/2005 | Mehr et al. | 709/206 |
| 2006/0036693 A1 * | 2/2006 | Hulten et al. | 709/206 |
| 2006/0047766 A1 * | 3/2006 | Spadea, III | 709/206 |
| 2006/0075030 A1 * | 4/2006 | van Riel | 709/206 |
| 2006/0080444 A1 * | 4/2006 | Peddemors et al. | 709/227 |
| 2006/0092936 A1 * | 5/2006 | Luss | 370/389 |
| 2006/0179113 A1 * | 8/2006 | Buckingham et al. | 709/206 |
| 2006/0212931 A1 | 9/2006 | Shull et al. | |
| 2006/0288076 A1 | 12/2006 | Cowings et al. | |
| 2007/0078936 A1 * | 4/2007 | Quinlan et al. | 709/206 |
| 2007/0192855 A1 * | 8/2007 | Hulten et al. | 726/22 |
| 2007/0214220 A1 * | 9/2007 | Alsop et al. | 709/206 |
| 2007/0250644 A1 * | 10/2007 | Lund et al. | 709/245 |

(Continued)

OTHER PUBLICATIONS

"Like a credit score, a Sender Score is an indication of the trustworthiness of an email source", retrieved at <<https://www.senderscore.org/senderscore/>>, 2010.

(Continued)

*Primary Examiner* — Razu Miah
(74) *Attorney, Agent, or Firm* — Louise Bowman; Danielle Johnston-Holmes; Micky Minhas

(57) ABSTRACT

Described is a technology by existing IP address blacklist data associated are accessed to statistically determine which IP addresses in the range are spam-related IP addresses. If enough are identified, the rest of the range's IP addresses are considered as likely being spam-related addresses. The entire range may be then added to a range weighted blacklist used to detect spam. Before adding the range to the range weighted blacklist, the addresses may be further processed against known good traffic data and/or safe list data to determine whether an exception exists that indicates a good sender. If there is an exception, the range is not added to the range weighted blacklist; the range may be shrunk and re-processed until added to the weighted blacklist or until the size is too small.

20 Claims, 4 Drawing Sheets

(56) References Cited

U.S. PATENT DOCUMENTS

| | | | |
|---|---|---|---|
| 2008/0082658 A1* | 4/2008 | Hsu et al. | 709/224 |
| 2008/0134300 A1* | 6/2008 | Izatt | 726/4 |
| 2008/0320119 A1* | 12/2008 | Achan et al. | 709/222 |
| 2009/0006569 A1* | 1/2009 | Morss et al. | 709/206 |
| 2009/0077617 A1* | 3/2009 | Levow et al. | 726/1 |
| 2010/0077052 A1* | 3/2010 | Alsop et al. | 709/206 |
| 2010/0082800 A1* | 4/2010 | Wei et al. | 709/224 |
| 2010/0083380 A1* | 4/2010 | Harris et al. | 726/24 |
| 2010/0122335 A1* | 5/2010 | Van der Merwe et al. | 726/11 |
| 2010/0325213 A1* | 12/2010 | Harris, III | 709/206 |
| 2011/0265014 A1* | 10/2011 | Koopman | 715/752 |
| 2011/0265015 A1* | 10/2011 | Koopman | 715/752 |
| 2012/0042098 A1* | 2/2012 | Kasslin et al. | 709/245 |

OTHER PUBLICATIONS

"Cloudmark Sender Intelligence", retrieved at <<http://www.cloudmark.com/en/serviceproviders/sender-intelligence.html>>, 2010.

"What is the SpamCop Blocking List (SCBL)?", retrieved at <<http://www.spamcop.net/fom-serve/cache/297.html>>, 2010.

* cited by examiner

RANGE WEIGHTED INTERNET PROTOCOL ADDRESS BLACKLIST

BACKGROUND

E-mail spam refers to unsolicited email messages that are sent by "spammers" to large numbers of recipients, few of whom want to receive them. Spamming is undesirable in many ways, including that it costs recipients time to delete the messages, and requires email service providers to provide resources to distribute and/or store the generally unwanted messages.

To detect currently known senders of spam, email service providers maintain lists of Internet Protocol (IP) addresses, referred to as blacklists. Messages from blacklisted IP addresses are (to a high probability) from spammers, and may be handled differently from other messages, e.g., the messages may be not accepted for distribution.

Spammers get around such blacklists by regularly changing their IP addresses. Each time a spammer changes an IP address, the email server accepts the email message, and uses CPU time to determine whether the mail being sent is spam, in which event it is automatically filtered into a junk mail folder or the like. Only after repeated processing of spam messages from such an IP address is that IP address added to the blacklist of "Bad" IP addresses on the receiving server. When this happens, the spammer switches to yet another IP address, and the process repeats.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which existing blacklist data IP addresses is accessed to determine which IP addresses in a given range are spam-related IP addresses that have been identified as corresponding to spam messages. If enough have been identified as spam-related, e.g., statistically, the rest of the range's IP addresses are considered as likely being spam-related addresses. The entire range may be then used to block messages from IP addresses, e.g., by adding the range to a range weighted blacklist.

In one aspect, before adding the range to the range weighted blacklist, the addresses of the range may be further processed against known good traffic data and/or safe list data to determine whether an exception exists that indicates an IP address from a good sender. If so, the range is not added to the range weighted blacklist.

In one aspect, if not enough IP addresses of the range are considered as likely being spam-related addresses, and/or an exception exists, the range may be reduced in size. The reduced-size range may be re-processed in the above manner, until some set of IP addresses is added to the weighted blacklist, or until a stopping criterion is met, e.g., the size is too small.

With the range weighted blacklist generated by adding ranges, a spam detection component may access the weighted blacklist to determine from an input message's IP address whether the input message likely corresponds to spam. Such a message may be blocked. The weighted blacklist may be used in conjunction with one or more conventional blacklists, and/or combined with one or more conventional blacklists, for purposes of detecting spam.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards identifying ranges or other sets of IP addresses on the Internet that (to a high probability) likely correspond to spam senders, including before those addresses have actually sent spam. Then, individual IP addresses in such ranges may be proactively blocked from sending spam. To this end, existing blacklists patterns are used to help identify candidate ranges for blocking, which are then further processed by accessing other data, e.g., a safe list database and traffic data, to reduce the chances of blocking email messages from good mail servers.

It should be understood that any of the examples herein are non-limiting. As one example, while email spamming is described, any other type of electronic spam detection may benefit from the technology described herein, e.g., communications sent with respect to other media such as instant messaging, social networking, mobile media and so forth. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in data communications in general.

Figure 1:
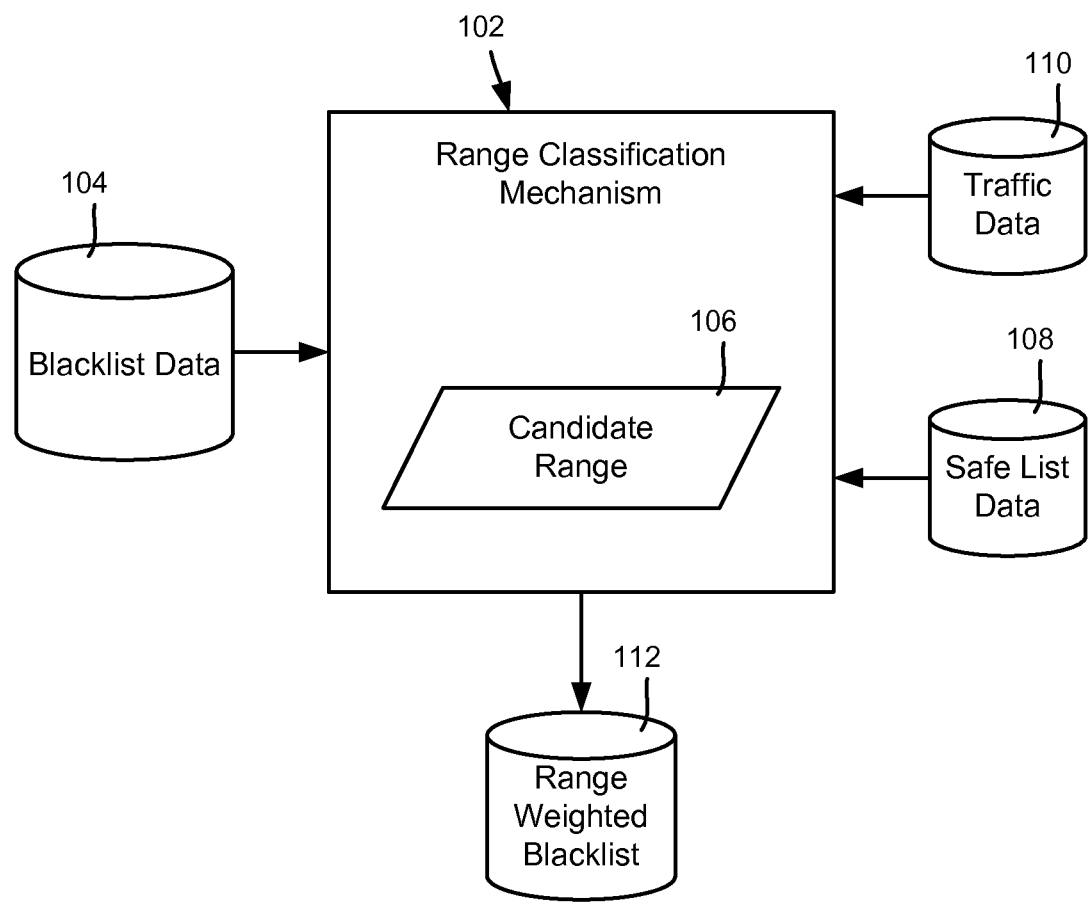
FIG. 1 is a block diagram representing example components and data for generating a range weighted blacklist.

FIG. 1 shows a block diagram in which a range classification mechanism 102 determines ranges of IP addresses to block based on the likelihood that the IP addresses in each range correspond to a spammer. To this end, the technology herein leverages the observation that spammers tend to purchase an array of IP addresses; then as each address becomes blocked over time as a result of spam detection, the spammer changes to another IP address among the remaining non-blocked addresses. Indeed, research on blacklists shows that over time, such arrays of IP addresses often are blocked.

Based on this, the range classification mechanism 102 processes existing blacklist data 104 to look for ranges that are not yet individually blocked, yet given time, likely will be blocked by conventional blacklisting techniques. To this end, the range classification mechanism 102 determines a candidate range 106 that fits the profile of a spammer's addresses, e.g., based on statistics or the like. For example, if some value/percentage of IP addresses in a range (e.g., 200 or more out of 256, 10 or more out of 256 or some other number) are already identified in the existing blacklist data 104 as being from a spammer, then it is likely that the remaining addresses in that range are also from a spammer.

However, simply using a count or percentage may be too aggressive and block good IP addresses. Thus, as a safeguard against blocking messages from good IP addresses, in one implementation the range classification mechanism 102 uses other information, comprising safe list data 108 that identifies the IP addresses of known human senders, and traffic data 110 identifying IP addresses corresponding to messages that were actually used and not previously identified as spam (at least not statistically). If no such information is present for this range, the candidate range 106 is added to a range weighted blacklist 112. Otherwise, the mechanism 102 shrinks the candidate range 106, which may continue until no such information is present and the narrowed range is added to the range weighted blacklist 112, or the range becomes too small and discarded. Additional details of example processing to generate the range weighted blacklist 112 are described below with reference to FIG. 3.

Figure 2:
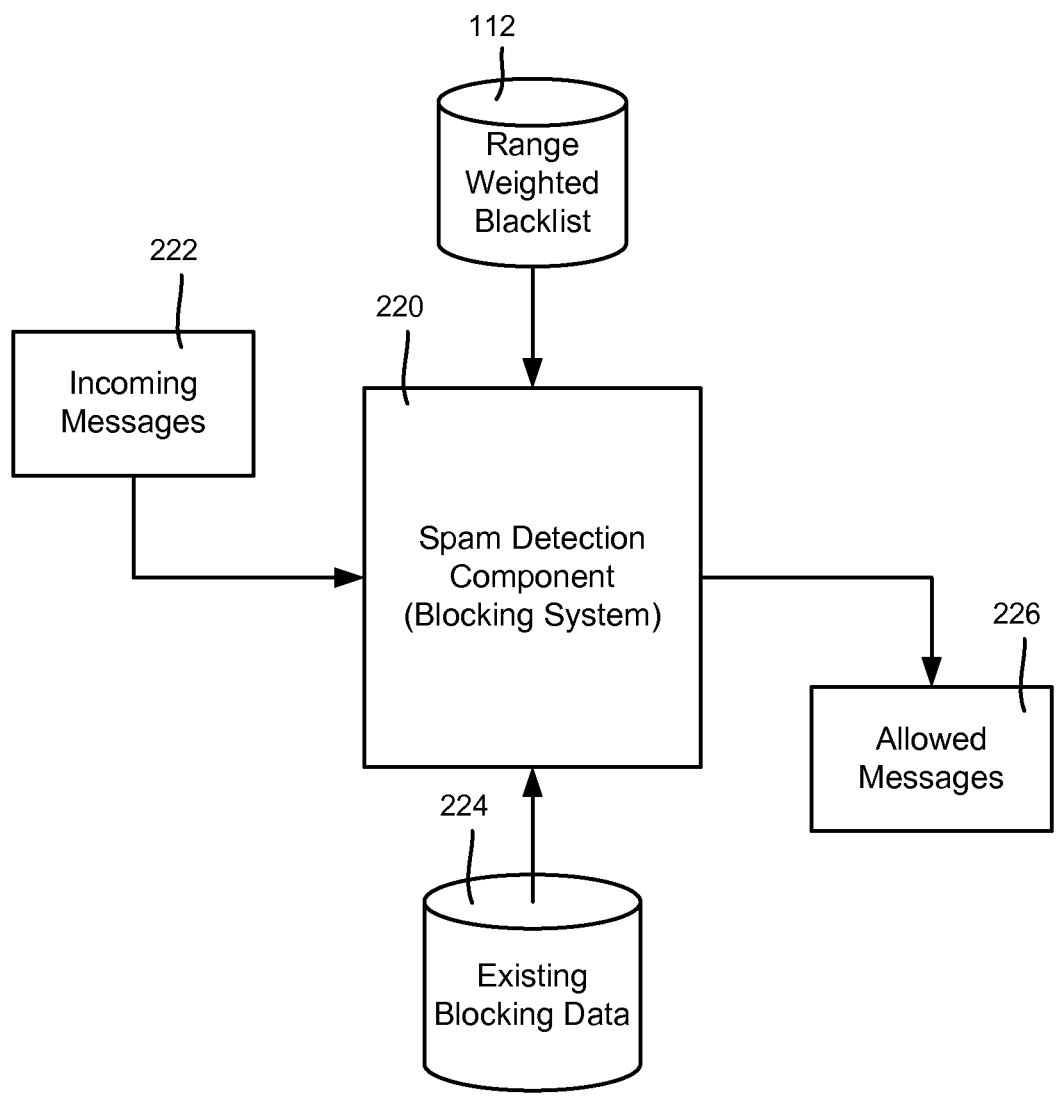
FIG. 2 is representation of using a range weighted blacklist to block spam messages.

FIG. 2 generally represents a spam detection component 220 (e.g., of a spam blocking system) that uses the range weighted blacklist 112 to selectively detect likely spam messages based on their corresponding IP addresses. If not determined to be within a range for a given address, the message may still be from a spam-related address, just not within any range. Thus, the address may be further evaluated against existing blocking data 224 (e.g., of one or more conventional blacklists); this allows for fine-grained detection if the coarse-grained detection obtained via the range weighted blacklist provides an unknown result. Allowed messages 226 are delivered normally, while spam messages are blocked as desired by the system 220, e.g., rejected or quarantined. Note that it is feasible to combine one or more range weighted blacklists with one or more existing blacklists into a single data store that need only be accessed once for any input address, which possibly may be hashed or otherwise indexed for efficient lookup.

Figure 3:
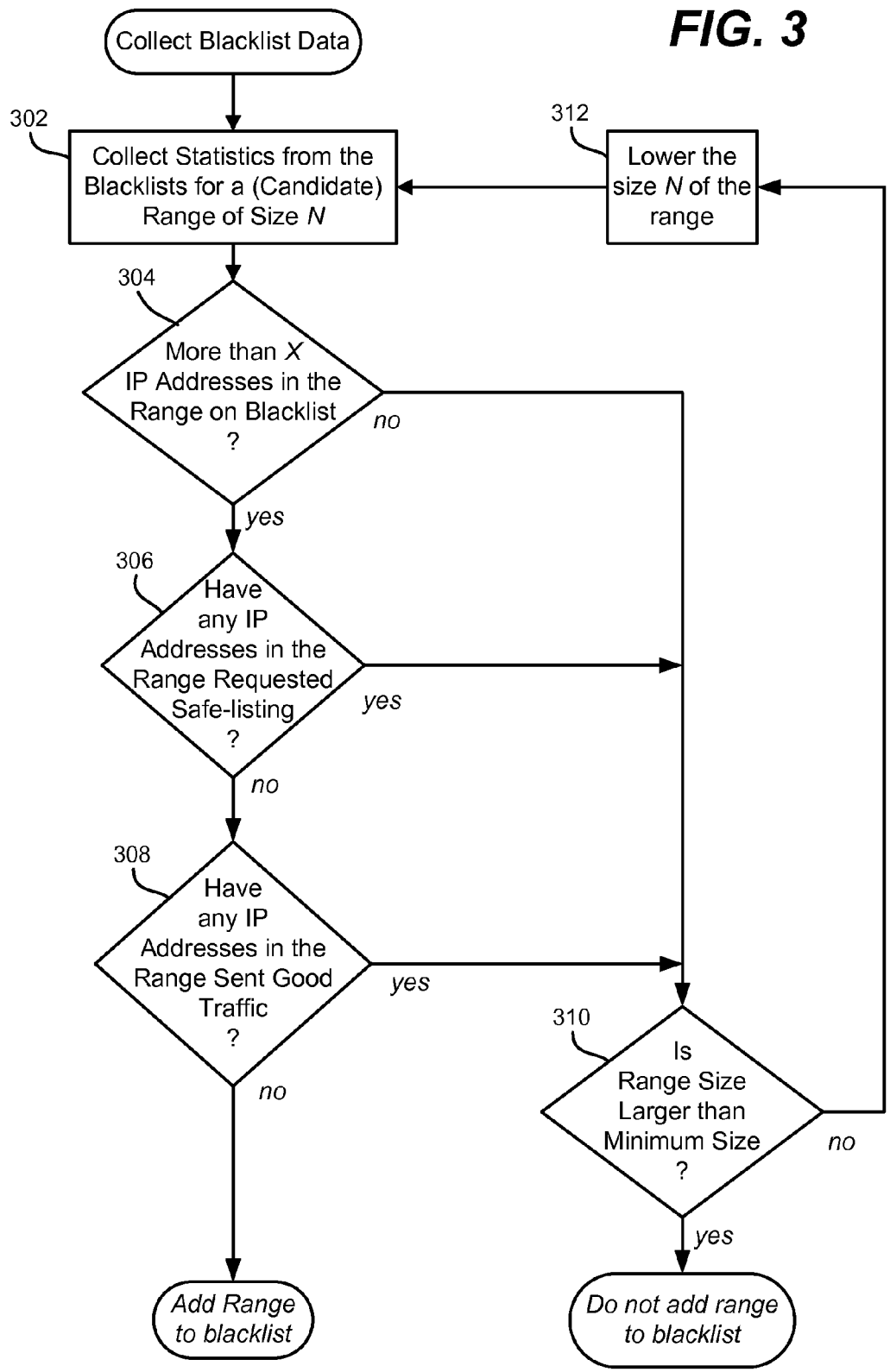
FIG. 3 is flow diagram showing example steps for generating a range weighted blacklist.

FIG. 3 is a flow diagram showing example steps that may be used to generate a range weighted blacklist, beginning at step 302 which represents collecting statistical information from one or more existing, conventional blacklists for a candidate range, or more simply, the range currently being processed. Note that the range may be some initial size value N, which may be a configurable parameter; (N also may be lowered during processing of the range, as described below with reference to step 312).

Step 304 evaluates how many IP addresses in the range are already being blocked in a blacklist. As mentioned above, N may vary, and thus the evaluation may be made on a percentage basis, where X is the threshold percentage, which may be a configurable parameter. In other words, once more than X percent of IP addresses in the range have been blocked, the range classification mechanism further considers blocking the entire range by branching to step 304. Otherwise, the process branches to step 310, described below. Note that it may be assumed that the blacklist is correct, whereby if all IP addresses in the range are already blocked by the blacklist, then the classification mechanism may select a different candidate range to process, (although the mechanism may still blacklist the entire range, such as for efficiency reasons).

Further note that the value corresponding to X may be lower, and that X need not be a percentage, but a fixed or otherwise varying number. For example, if X is fixed at 10, then for a range size N of 256, it is more likely that the threshold evaluation at step 304 will be met. As can be readily appreciated, controlling X and N allows for adjusting the aggressiveness of the range weighted blacklist.

As mentioned above, a danger in blocking an IP address that has not been blocked before is that the system can block a good mail server. To reduce the chances of this, at step 306 the safe list (delisting) database is checked to determine whether any IP addresses in the range have requested to be removed from the list of blocked IP addresses. For example, on relatively infrequent occasions, a non-spam sender will notify an email service to indicate that his or her mail is being incorrectly blocked as spam when it is not. If this has occurred, this IP address is an exception, the range is considered as having a good sender, and is further processed by step 306 branching to step 310 as described below.

Another check, performed at step 308, evaluates whether some traffic coming from the range has been previously determined to be good traffic. More particularly, as is known, emails may be tested against rules and the like to determine whether they are spam, which is one way that the blacklist data are generated over time. Logs are maintained that provide information on which IP addresses are considered to be spam senders, as well as which IP addresses are considered good traffic, e.g., when statistically, email messages from an IP address are known to pass the test. Thus, step 308 evaluates a traffic database or the like to further ensure that good mail servers are not added to the blocked ranges of IP addresses. Note that the evaluation may be based on statistics, whereby the mechanism may adjust what traffic from non-blocked IP addresses is considered to be "good" traffic, to make spam blocking more or less aggressive.

If the evaluations at step 304, 306 and 308 indicate that the range is likely that of a spam sender, then the range is added to the range weighted blacklist, where messages from that range are handled differently (e.g., blocked) when received. However, if not added because of any of the evaluations, it is possible that a smaller range may result in a range being added.

Thus, until the range is added or the range is too small (step 310), the mechanism may shrink the range size (step 312) and repeat processing as described above. For example, the candidate range may be halved from its previous value (256 to 128, 128 to 64 and so on) until some stopping criterion is reached, such as a minimum size. Note that the minimum size may be fixed, or may correspond to X, e.g., if X is fixed at 10, then the candidate range will be shrunk to 16, but not 8, and so on. Further note that if the minimum size is reached, step 310 ends the process without adding the range, however it is still feasible that the original blacklist, which may be as granular as a single IP address, may block email messages from an individual IP address.

As can be seen, by using the data from one or more blacklists with other data, e.g., from delisting and traffic databases, the system can relatively safely block entire ranges of the Internet, that is, block while controllably keeping the risk of blocking a good mail server as low as desired. This facilitates proactively blocking possibly large sections of the Internet before spammers can send spam on IP addresses corresponding to those sections.

Exemplary Operating Environment

Figure 4:
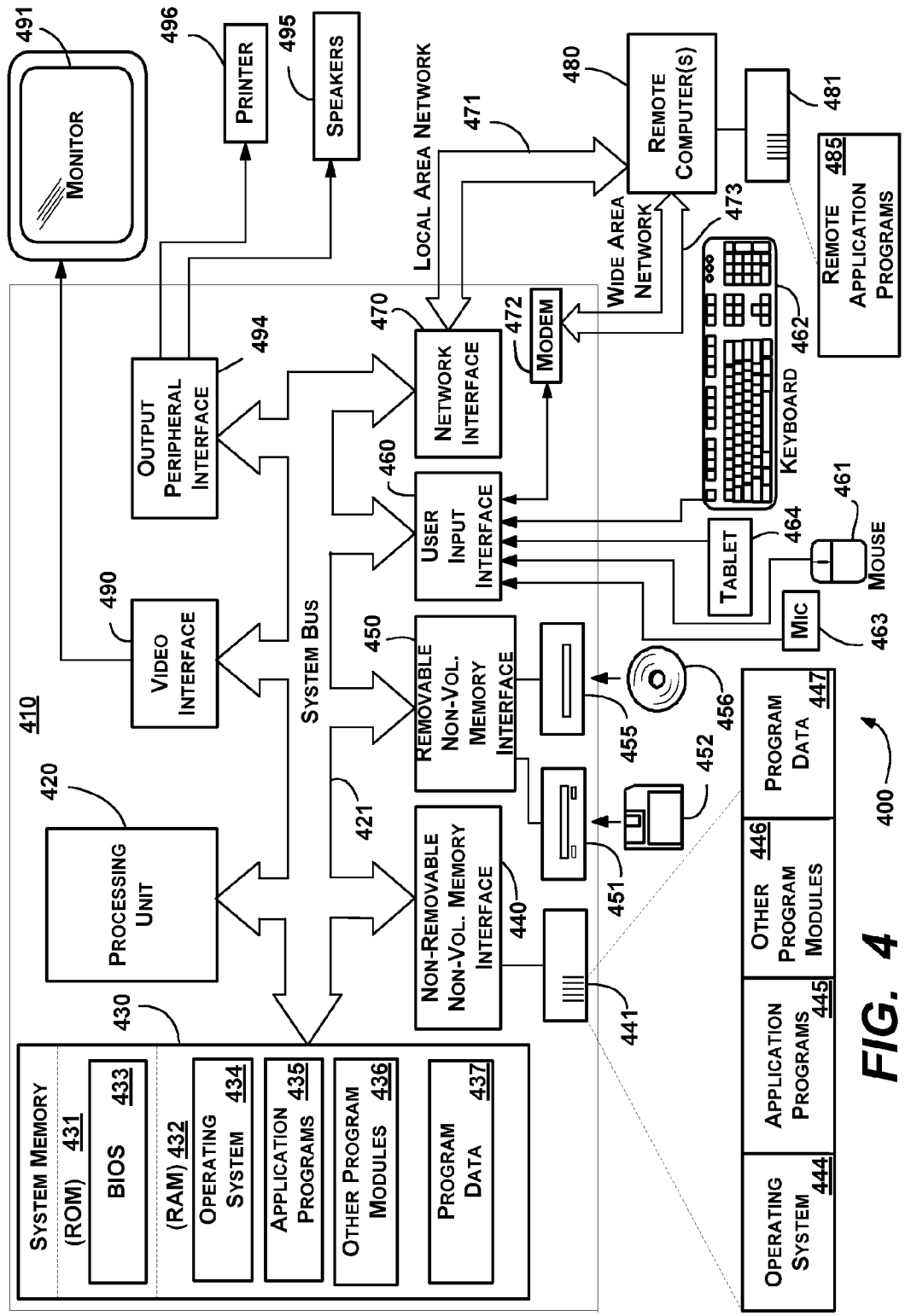
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method performed at least in part on at least one processor, comprising:
  accessing data associated with a candidate range of Internet Protocol (IP) addresses to determine which IP addresses in the candidate range likely correspond to spam senders before the IP addresses have sent spam, in which the data indicates which IP addresses in the candidate range of IP addresses are spam-related IP addresses that have been identified as corresponding to spam messages;
  determining a value corresponding to how much of the candidate range comprises the spam-related IP addresses;
  evaluating traffic data corresponding to messages not identified as spam to determine whether to add the candidate range of IP addresses to a range weighted blacklist;
  evaluating safe list data to determine whether to add the candidate range of IP addresses to the range weighted blacklist, wherein the safe list data contains information that indicates whether at least one IP address in the candidate range of IP addresses is identified in a safe list data store;
  determining a new value corresponding to how much of the candidate range comprises the spam-related IP addresses, wherein the new value is lower than the value, depending on results of evaluating the traffic data and the safe list data;
  adding the candidate range of IP addresses to the range weighted blacklist based at least in part on the new value; and
  using the range weighted blacklist to proactively block individual IP addresses in the candidate range before the individual IP addresses in the candidate range send spam, wherein the range weighted blacklist is used to determine whether an incoming message likely corresponds to a spam message.

2. The computer-implemented method of claim 1, wherein determining the value further comprises:
  computing a percentage representative of the spam-related IP addresses relative to a size of the candidate range.

3. The computer-implemented method of claim 1, further comprising:
  narrowing the candidate range of IP addresses until a stopping criterion is met.

4. The computer-implemented method of claim 1, further comprising:
  determining whether at least one IP address in the candidate range has sent traffic data corresponding to messages not identified as spam, and if so, shrinking size of the candidate range.

5. The computer-implemented method of claim 1, further comprising:
  narrowing the candidate range of IP addresses until no information representative of traffic data corresponding to messages not identified as spam, or safe listed IP addresses, is present to form a narrowed candidate range; and
  adding the narrowed candidate range to the range weighted blacklist.

6. The computer-implemented method of claim 1, further comprising:
  combining the range weighted blacklist with one or more existing blacklists to form a single data store that is accessed for any input IP address.

7. In a computing environment, a system comprising:
  at least one processor;
  a memory coupled to the at least one processor; and
  a classification mechanism configured to determine a set of Internet Protocol (IP) addresses for proactive blocking before the set of IP addresses send spam, the classification mechanism processes existing blacklist data to determine which IP addresses in the set of IP addresses likely corresponds to spam-related messages, wherein the classification mechanism is configured to add the set of IP addresses to a weighted blacklist based at least in part upon statistics obtained from the existing blacklist data, including based on whether a number of IP addresses in the set of IP addresses are identified in the existing blacklist data as already corresponding to the spam-related messages;
  a first data store containing traffic data that indicates whether traffic corresponding to messages not identified as spam were previously received from at least one IP address in the set of IP addresses, wherein the classification mechanism is further configured to process the traffic data from the first data store to determine whether to add the set of IP addresses to the weighted blacklist; and a second data store containing information that indicates whether at least one IP address in the set is identified in a safe list data store, wherein the classification mechanism is further configured to process safe list data from the second data store to determine whether to add the set of IP addresses to the weighted blacklist.

8. The system of claim 7, wherein the weighted blacklist is used to proactively block individual IP addresses before the individual IP addresses send spam.

9. The system of claim 7, wherein the set of IP addresses comprises a contiguous range of IP addresses.

10. The system of claim 9, wherein a size of the range of IP addresses is configurable.

11. The system of claim 9, wherein the classification mechanism is configured to adjust a range size until the set of IP addresses is added to the weighted blacklist or until a stopping criterion is met.

12. The system of claim 7, wherein the range weighted blacklist is combined with one or more existing blacklists to form a single data store.

13. The system of claim 7, wherein the classification mechanism is further configured to select a different candidate range of IP addresses to process, wherein the different candidate range of IP addresses further comprises a different set of Internet Protocol (IP) addresses for proactive blocking.

14. The system of claim 7, wherein the number of IP addresses in the set identified in the existing blacklist data as already corresponding to the spam-related messages is configurable.

15. The system of claim 7, further comprising:
a spam detection component that accesses the weighted blacklist to determine, from an IP address of an input message, whether the input message likely corresponds to spam.

16. The system of claim 7, further comprising:
a spam detection component that accesses the weighted blacklist to determine, from an IP address of an input message, whether the input message likely corresponds to spam, and if not determined from the weighted blacklist, accesses the existing blacklist data to determine, from the IP address of an input message, whether the input message likely corresponds to spam.

17. One or more computer storage devices having computer-executable instructions, which on execution perform operations of a process, comprising:
(a) determining based upon blacklist IP address data whether a range of IP addresses is more likely than not to correspond to spam messages, and if not, advancing to operation (e), wherein determining based upon the blacklist IP address data whether the range of IP addresses is more likely than not to correspond to the spam messages comprises computing, from the blacklist IP address data, how many addresses in the range of IP addresses are already identified as being associated with the spam messages;
(b) determining whether at least one IP address in the range is safe listed, and if so, advancing to operation (e);
(c) determining whether at least one IP address in the range has sent traffic not identified as spam, and if so, advancing to operation (e);
(d) adding the range to a range weighted database and advancing to operation (f);
(e) determining whether the range meets a minimum size criterion, and if not, shrinking the range and returning to operation (a); and
(f) ending the process with respect to the range.

18. The one or more computer storage devices of claim 17 having further computer-executable instructions comprising, using a range weighted blacklist, associated with the range weighted database, to determine whether an incoming message likely corresponds to a spam message.

19. The one or more computer storage devices of claim 18 having further computer-executable instructions comprising, proactively blocking individual IP addresses before the individual IP addresses send spam using the range weighted blacklist.

20. The one or more computer storage devices of claim 17 having further computer-executable instructions comprising, after operation (f), selecting a different initial range as the range and returning to operation (a).

* * * * *